US010803129B2

(12) United States Patent
Zhuang et al.

(10) Patent No.: US 10,803,129 B2
(45) Date of Patent: Oct. 13, 2020

(54) METHOD AND APPARATUS FOR PROCESSING ONLINE USER DISTRIBUTION

(71) Applicant: Tencent Technology (Shenzhen) Company Limited, Shenzhen (CN)

(72) Inventors: Qidong Zhuang, Shenzhen (CN); Junhong Tu, Shenzhen (CN); Xiaojun Liu, Shenzhen (CN); Jie Yang, Shenzhen (CN); Ming Rao, Shenzhen (CN); Nan Qin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 407 days.

(21) Appl. No.: 15/898,385

(22) Filed: Feb. 16, 2018

(65) Prior Publication Data
US 2018/0173801 A1 Jun. 21, 2018

Related U.S. Application Data

(63) Continuation of application No. 14/751,133, filed on Jun. 26, 2015, now abandoned, which is a (Continued)

(30) Foreign Application Priority Data

Dec. 26, 2012 (CN) .......................... 2012 1 0575911

(51) Int. Cl.
*G06F 7/00* (2006.01)
*G06F 16/951* (2019.01)
(Continued)

(52) U.S. Cl.
CPC ............ *G06F 16/951* (2019.01); *G06F 16/22* (2019.01); *G06F 16/248* (2019.01);
(Continued)

(58) Field of Classification Search
CPC .................................................... G06F 16/951
See application file for complete search history.

(56) References Cited

U.S. PATENT DOCUMENTS 7,133,041 B2 * 11/2006 Kaufman ................ G06T 15/06
345/419
8,745,516 B2 * 6/2014 Mason ................. G09B 29/007
715/767
(Continued)

FOREIGN PATENT DOCUMENTS

CN 101079839 A 11/2007

OTHER PUBLICATIONS

Tencent Technology, ISRWO, PCT/CN2013/084364, Jan. 2, 2014, 7 pgs.
(Continued)

Primary Examiner — Eliyah S. Harper
(74) Attorney, Agent, or Firm — Morgan, Lewis & Bockius LLP

(57) ABSTRACT

The present disclosure relates to a method for processing online user distribution. The method includes acquiring a map for displaying online user distribution; determining the projection algorithm of the map; determining intermediate coordinates of at least one of the points according to a longitude and a latitude and the projection algorithm, and acquiring, by using a fitting algorithm, approximate solutions of functions of mapping the intermediate coordinates to the coordinates on the map. The method further includes calculating coordinates of each online user on the map according to the projection algorithm and the approximate (Continued)

solutions of the mapping functions; and assembling distribution data of online users on the map according to coordinates of all the online users on the map. The present disclosure further provides an apparatus for processing online user distribution. By using embodiments of the present disclosure, online user distribution can be displayed on a map and higher precision and real-time data quality are achieved.

16 Claims, 22 Drawing Sheets

Related U.S. Application Data continuation of application No. PCT/CN2013/084364, filed on Sep. 26, 2013.

(51) Int. Cl.
    *G06F 16/22*     (2019.01)
    *G06F 16/248*     (2019.01)
    *G06F 16/44*     (2019.01)
    *G06F 16/903*     (2019.01)
    *G06Q 10/04*     (2012.01)
    *H04L 12/911*     (2013.01)
    *H04L 29/12*     (2006.01)

(52) U.S. Cl.
    CPC ...... *G06F 16/444* (2019.01); *G06F 16/90344* (2019.01); *G06Q 10/04* (2013.01); *H04L 47/78* (2013.01); *H04L 61/2007* (2013.01); *H04L 61/609* (2013.01)

(56) References Cited

U.S. PATENT DOCUMENTS

| | | | |
|---|---|---|---|
| 9,046,378 B2* | 6/2015 | Ogawa | G08G 1/167 |
| 2003/0128182 A1* | 7/2003 | Donath | B60R 1/00 |
| | | | 345/156 |
| 2005/0267854 A1* | 12/2005 | Blais | G06F 8/20 |
| 2007/0081496 A1* | 4/2007 | Karge | G01C 21/206 |
| | | | 370/331 |
| 2007/0176932 A1 | 8/2007 | Salmre | |
| 2008/0002041 A1* | 1/2008 | Chuang | H04N 9/3185 |
| | | | 348/241 |
| 2009/0077221 A1 | 3/2009 | Eisenstadt et al. | |
| 2010/0085381 A1* | 4/2010 | Cunningham | G06F 16/29 |
| | | | 345/645 |
| 2011/0025715 A1* | 2/2011 | Uchida | H04N 1/00408 |
| | | | 345/660 |
| 2011/0173150 A1* | 7/2011 | van Zwol | G06N 7/005 |
| | | | 706/50 |
| 2012/0169766 A1 | 7/2012 | Leah et al. | |
| 2013/0085897 A1* | 4/2013 | Favoretto | G06Q 30/0641 |
| | | | 705/27.1 |
| 2013/0249913 A1* | 9/2013 | Smout | G06T 15/08 |
| | | | 345/424 |
| 2014/0120942 A1* | 5/2014 | Bowman | G09B 29/005 |
| | | | 455/456.1 |

OTHER PUBLICATIONS

Tencent Technology, IPRP, PCT/CN2013/084364, Jun. 30, 2015, 4 pgs.
Jenny Bernhard, Adaptive Composite Map Projections, Dec. 2012, IEEE Transactions on Visualization and Computer Graphics, vol. 18, pp. 2575-2582.

* cited by examiner

METHOD AND APPARATUS FOR PROCESSING ONLINE USER DISTRIBUTION

RELATED APPLICATION

This application is a continuation of U.S. application Ser. No. 14/751,133, filed Jun. 26, 2015 and entitled "METHOD AND APPARATUS FOR PROCESSING ONLINE USER DISTRIBUTION" which is a continuation of PCT Application No. PCT/CN2013/084364, filed on Sep. 26, 2013, which claims priority to Chinese Patent Application No. 201210575911.8, entitled "METHOD AND APPARATUS FOR PROCESSING ONLINE USER DISTRIBUTION" filed by Tencent Technology (Shenzhen) Company Limited on Dec. 26, 2012, all of which are incorporated by reference in their entirety.

FIELD OF THE TECHNOLOGY

The present disclosure relates to the field of network technologies, and in particular, to a method and an apparatus for processing online user distribution.

BACKGROUND OF THE DISCLOSURE

In some Internet systems or services, there may be over a hundred million users. The users frequently log into the system or take other actions. If geographical distribution and behavior states such as picture uploading and video chat of online users can be displayed precisely, dynamically, and in real time, the Internet systems or services can realize higher market development potentials. Further, in different regions, it may be convenient to observe, monitor, and discover an exception at a regional/internet data center (IDC) level in real time. This strengthens the Internet systems and related services.

To display geographical distribution and behavior states of online users precisely, dynamically, and in real time, the Tencent Company has unveiled the "Tencent Nebula" project. The "Tencent Nebula" project uses the Mercator projection map of China, collects IP address databases corresponding to the provinces, and then displays distribution and behavior changes of online users in the relevant provinces and cities on the map of China according to user distributions of cities in each province. The "Tencent Nebula" displays the states of users on the map using a random algorithm, and achieving a particle effect by means of offset distribution. Because the "Tencent Nebula" uses a Flash technology, the "Tencent Nebula" internally provides a function preventing a particle from being rendered outside the area of each province. The "Tencent Nebula" implements dynamic displays and state management of the particles by using an object pool that is based on an array.

In addition, the Facebook company has unveiled the "Friends on a world map" application. Ten million Facebook friend pairs are sampled in a database. City pairs are connected with large arcs of color gradient on a Mercator projection of world map of a specific perspective. Further, the color and height of each arc are determined by a weighting function of a Euclidean distance between cities and a quantity of friend pairs between cities. In this way, a relationship chain of the sampled friend pairs is statically represented on the world map.

However, there are a few issues with the present applications.

(1) A used or generated map is a bitmap. Map zooming in arbitrary expansion cannot be implemented on the bitmap. An online user density and an online user behavior and density of any region and availability of a service in the region cannot be viewed on the map.

(2) Display can be performed only on a projection map having a known projection algorithm and projection parameters.

(3) The applications often cannot provide maps in real-time.

(4) Precision can only reach certain level of granularity.

(5) The maps provided have limited interactive features.

SUMMARY

The present disclosure provides a method and an apparatus for processing online user distribution, which can display behavior states and geographical location distribution of online users on a map. The projection algorithm of the map is unknown. Embodiments consistent with the present disclosure can implement map zooming, and provide precise and real-time map data.

A method for processing online user distribution includes acquiring a map for displaying online user distribution, a projection algorithm of the map being unknown, the map including multiple points with known coordinates and longitudes and latitudes. The method further includes determining projection algorithm of the map; and determining intermediate coordinates of at least one of the points according to a longitude and latitude and the projection algorithm. The method also includes acquiring, by using a fitting algorithm, approximate solutions of functions of mapping the intermediate coordinates to the coordinates on the map, the points with known coordinates and longitudes and latitudes on the map being used for fitting calculation and precision checking in the fitting algorithm. The method also includes calculating coordinates of each online user on the map according to the projection algorithm and the approximate solutions of the mapping functions; and assembling distribution data of online users on the map according to coordinates of all the online users on the map. In the method, the projection algorithm of the map is not known in advance.

An apparatus for processing online user distribution includes an acquiring module, configured to acquire a map for displaying online user distribution, the map including multiple points with known coordinates and longitudes and latitudes. The apparatus also includes a first calculation module, configured to calculate the projection algorithm of the map; a second calculation module, configured to perform calculation to obtain intermediate coordinates of at least one of the points according to a longitude and a latitude and the projection algorithm, and acquire, by using a fitting algorithm, approximate solutions of functions of mapping the intermediate coordinates to the coordinates on the map. The points with known coordinates and longitudes and latitudes on the map are used for fitting calculation and precision checking in the fitting algorithm. The apparatus further includes a third calculation module, configured to calculate coordinates of each online user on the map according to the projection algorithm and the approximate solutions of the mapping functions; and a counting module, configured to count distribution data of online users on the map according to coordinates of all the online users on the map. In the processing apparatus, the projection algorithm of the map is not known in advance.

Beneficial effects of the method and the apparatus for processing online user distribution in the present disclosure are as follows: Behavior states and geographical location distribution of online users can be displayed on a map whose projection algorithm is unknown, map zooming in arbitrary expansion can be implemented, and higher precision and real-time quality are achieved.

BRIEF DESCRIPTION OF THE DRAWINGS

To make the foregoing and other objectives, features, and advantages of the present disclosure more comprehensible, preferred embodiments are described in detail below with reference to the accompanying drawings.

DESCRIPTION OF EMBODIMENTS

To further explain the technical means used in the present disclosure for achieving the intended objectives and the technical effects of the present disclosure, specific implementation manners, structures, features, and technical effects of the present disclosure are described in detail below with reference to the accompanying drawings and preferred embodiments.

Figure 1:
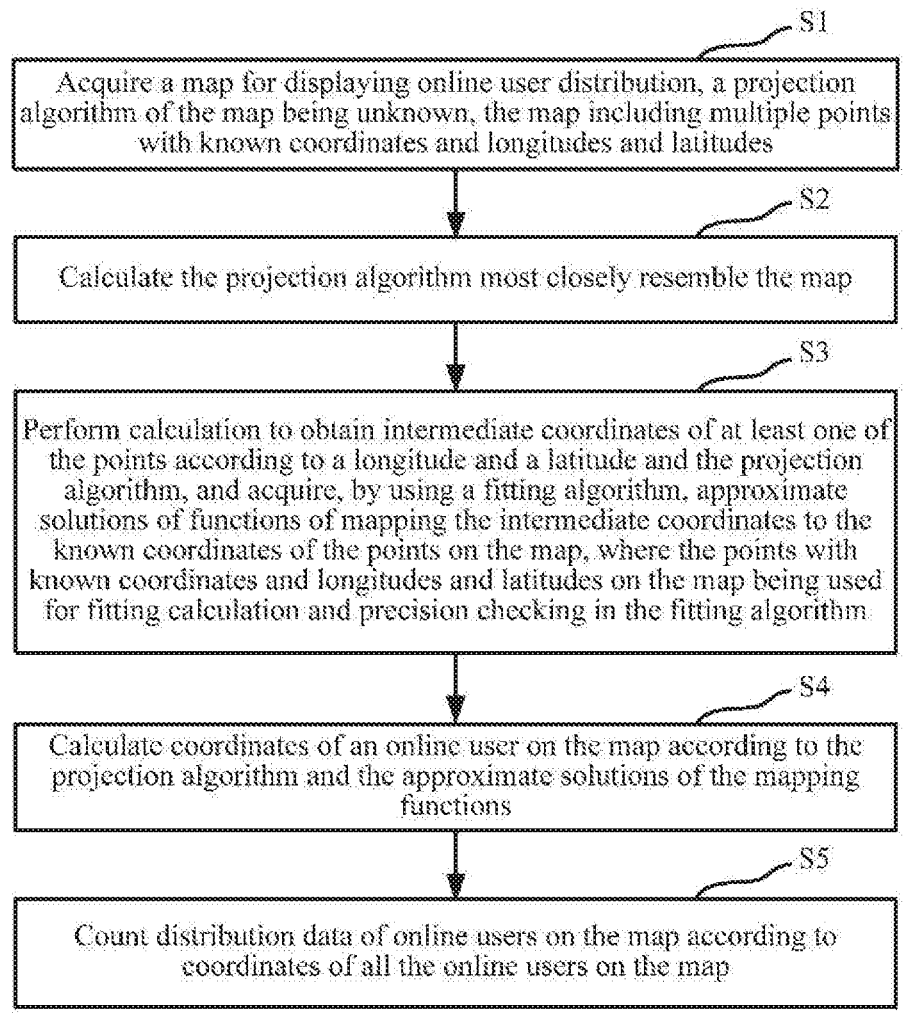
FIG. 1 is a flowchart of a method for processing online user distribution according to an embodiment of the present invention.

Referring to FIG. 1, FIG. 1 is a flowchart of a method for processing online user distribution according to an embodiment of the present invention. The processing method includes the following steps S1 to S5.

Step S1: Acquire a map for displaying online user distribution. A projection algorithm of the map is unknown. The map includes multiple points with known coordinates and longitudes and latitudes.

Step S2: Calculate the projection algorithm of the map.

Step S3: Calculate intermediate coordinates of at least one point according to a longitude and latitude and the projection algorithm, and acquire, by using a fitting algorithm, approximate solutions of functions of mapping the intermediate coordinates to the coordinates on the map. The points with known coordinates and longitudes and latitudes on the map are used for fitting calculation and precision checking in the fitting algorithm.

Step S4: Calculate coordinates of each online user on the map according to the projection algorithm and the approximate solutions of the mapping functions.

Step S5: Tally distribution data of online users on the map according to coordinates of all the online users on the map.

A description is provided below in further detail with reference to specific embodiments.

The map described in step S1 may be a standard map of China, or may be a map of another region or a world map. The map is produced by a professional map production organization or institution. To achieve an effect of map zooming, the map may use a format of scalable vector graphics (SVG). The map may be acquired from the Internet. Often the projection algorithm of the map is unknown. Therefore, coordinates corresponding to each level of territories on the map cannot be directly obtained from the map. However, longitudes and latitudes of multiple points on the map such as certain capital cities, and coordinates on the map are known.

Figure 2:
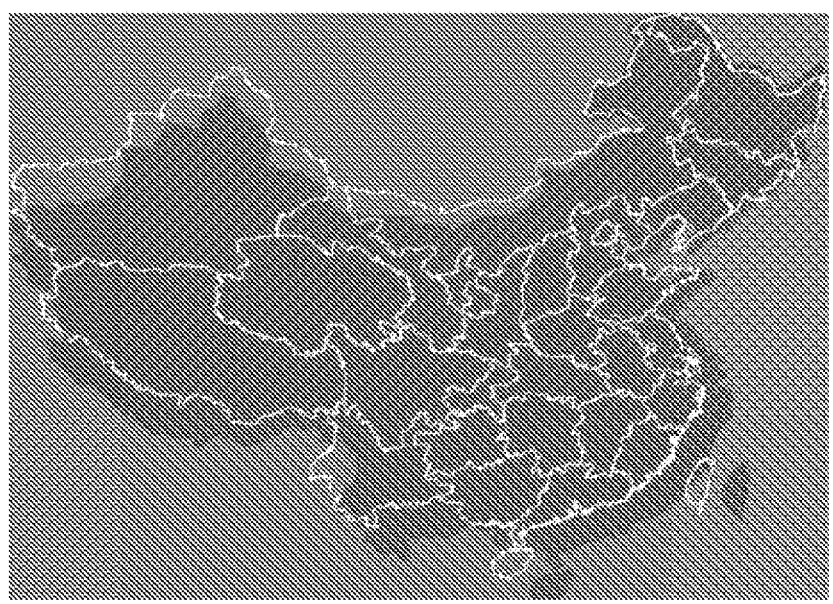
FIG. 2 is a schematic diagram of a projection map when a difference of rotation, stretching, and warping exists.

A map of China of national territories usually uses a Gauss-Kruger projection algorithm or a Lambert projection algorithm. A Google map (http://ditu.google.cn/) and a SoSo map (http://map.soso.com/) usually use a Mercator projection algorithm. However, an acquired projection algorithm used by a map may not be the Gauss-Kruger projection algorithm, the Lambert projection algorithm, or the Mercator projection algorithm, and an acquired projection parameter of a map may be unknown. Therefore, some differences of translation, zooming, rotation, and shear transformation always exist between the map and a projection map that is obtained by using the Gauss-Kruger projection algorithm, the Lambert projection algorithm, or the Mercator projection algorithm. For example, a difference of non-affine transformation may exist, as shown in FIG. 2.

Figure 3:
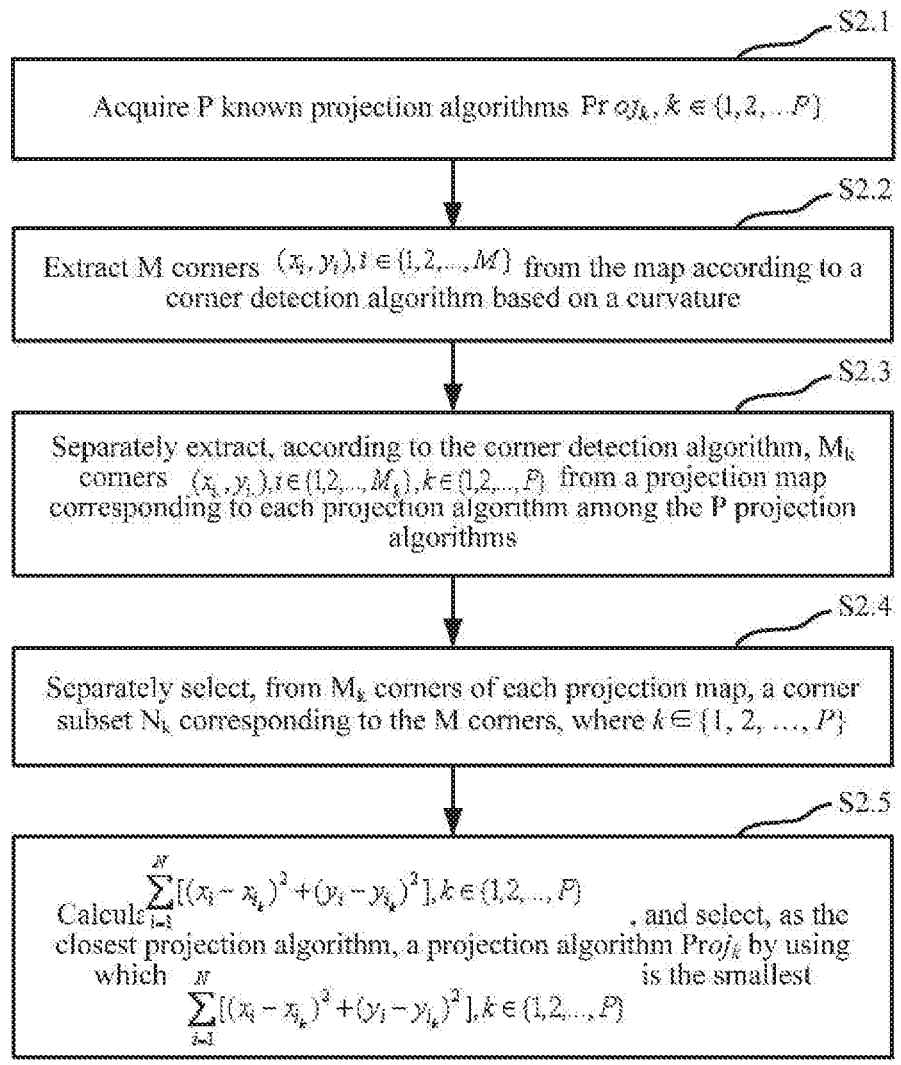
FIG. 3 is a flowchart showing calculation of the projection algorithm of an acquired map.

The projection algorithm of the map described in step S2 is used to indirectly calculate coordinates of each level of territories on the map. Referring to FIG. 3, the step of calculating the projection algorithm of the map specifically includes the following steps S2.1 to S2.5.

Step S2.1: Acquire P known projection algorithms $Proj_k$, $k \in \{1, 2, \ldots P\}$.

Figure 4:
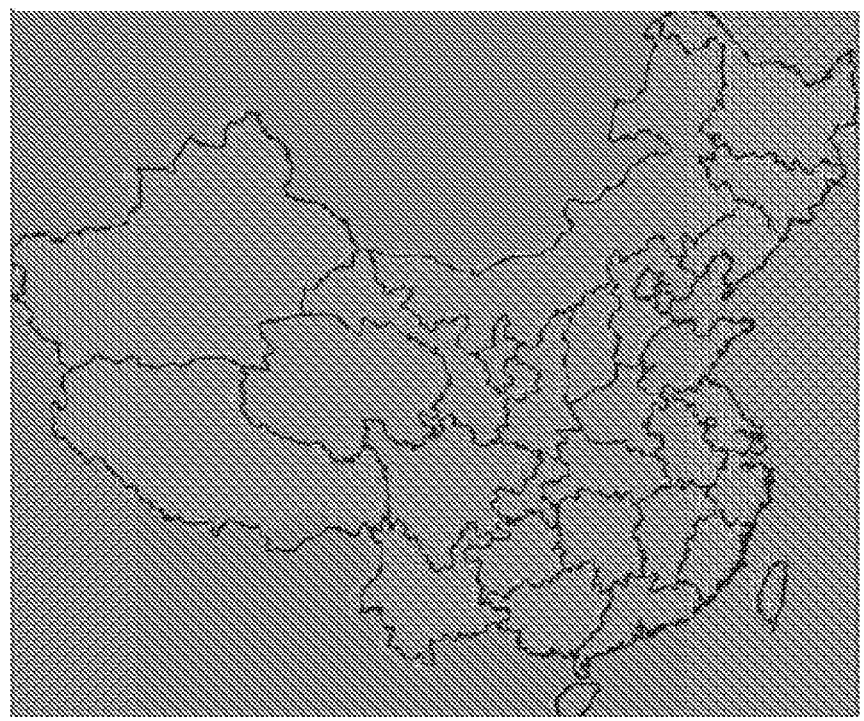
FIG. 4 shows a projection map corresponding to the projection algorithm obtained after corner match.

Step S2.2: Extract coordinates of M corners $(x_i, y_i)$, $i \in \{1, 2, \ldots M\}$ from the map according to a corner detection algorithm based on a curvature. The corners may be considered as extreme points of the map. A quantity of corners included in a graph is determined by smoothness of the graph. A smoother graph has fewer corners, and a rougher graph has more corners. A shape of the map can be approximately represented according to the M corners, for example, as shown in FIG. 4.

Step S2.3: Separately extract, according to the corner detection algorithm, $M_k$ corners $(x_i, y_i)$, $i \in \{1, 2, \ldots M_k\}$, $k \in \{1, 2, \ldots P\}$ from a projection map corresponding to each projection algorithm among the P projection algorithms.

Specifically, standard longitude and latitude data of a geographical location such as China corresponding to the map is acquired. The standard longitude and latitude data is projected onto a bitmap with a same size as that of the map by using the projection algorithm $Proj_k$, $k \in \{1, 2, \ldots P\}$, so as to obtain the projection map corresponding to each projection algorithm among the P projection algorithms. A shape of the projection map obtained by means of projection by using the projection algorithm $Proj_k$, $k \in \{1, 2, \ldots P\}$ can be approximately represented according to the $M_k$ corners.

Step S2.4: Separately select, from $M_k$ corners of each projection map, a corner subset $N_k$ corresponding to the M corners, where $k \in \{1, 2, \ldots P\}$. A shape of a map represented by each selected corner subset $N_k$ is most similar to the shape of the map represented by the M corners.

Step S2.5: Calculate $$\sum_{i=i}^{N} [(x_i - x_{i_k})^2 + (y_i - y_{i_k})^2], k \in \{1, 2, \ldots P\},$$

and select, as the projection algorithm, a projection algorithm $Proj_k$ by using which $$\sum_{i=i}^{N} [(x_i - x_{i_k})^2 + (y_i - y_{i_k})^2], k \in \{1, 2, \ldots P\},$$

is the smallest.

In step S3, it is assumed that a longitude and a latitude of a known point on the map is (lat, lon), intermediate coordinates of the point is (m_x, m_y), and coordinates, on the map, corresponding to the intermediate coordinates (m_x, m_y) is (x, y). The intermediate coordinates (m_x, m_y) may be obtained according to the projection algorithm, the longitude, and the latitude (lat, lon). Functions of mapping the intermediate coordinates (m_x, m_y) to the coordinates (x, y) on the map may be represented as function formulas as follows: x=f(m_x, m_y), and y=g(m_x, m_y). It can be known from computer graphics knowledge that the two functions f and g usually include a large amount of trigonometric transform; therefore, both the functions may be expanded into infinite polynomials related to (m_x, m_y).

Figure 5:
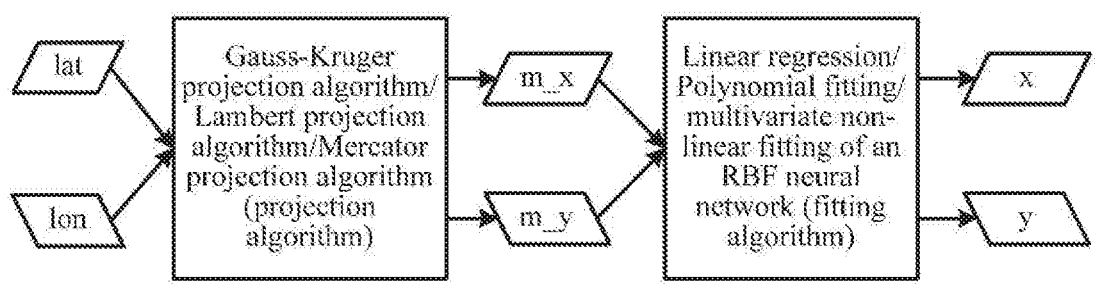
FIG. 5 is a schematic diagram showing calculation of approximate solutions of functions of mapping intermediate coordinates to coordinates on a map.

Approximate solutions of the functions f and g of mapping the intermediate coordinates (m_x, m_y) to the coordinates (x, y) on the map may be calculated by using the fitting algorithm (as shown in FIG. 5). The points with known coordinates and longitudes and latitudes on the map may be used for fitting calculation and precision checking in the fitting algorithm. For example, the points with known coordinates and longitudes and latitudes are divided into two subsets, where one subset is used for fitting calculation, and the other subset is used for precision checking on the fitting calculation.

The fitting algorithm includes, for example, three types as follows.

(1) Linear regression fitting. If it is only considered that only a difference of translation and/or scaling transformation exists between the map and a projection map corresponding to the projection algorithm (including a projection parameter), the f is a linear function only related to m_x, and the g is a linear function only related to m_y. However, an experiment proves that a result obtained by using the linear regression fitting algorithm has low precision, and errors of some cities reach a dozen pixels.

(2) Polynomial fitting. If it is considered that only a difference of non-linear stretching in transverse and longitudinal directions exists between the map and a projection map corresponding to the projection algorithm (including a projection parameter), x is related to only m_x, and y is related to only m_y, both of which however are non-linear relationships. In this way, two higher-order functions x=f(m_x, m_y) and y=g(m_x, m_y) may be obtained by means of polynomial fitting. An experiment proves that location errors of provincial capitals on the map of China can be reduced below 3 pixels by using an eighteenth-order polynomial. However, by observation, there is still a big error. The map of China is used as an example. Hong Kong falls in the sea east of Hong Kong.

Figure 6:
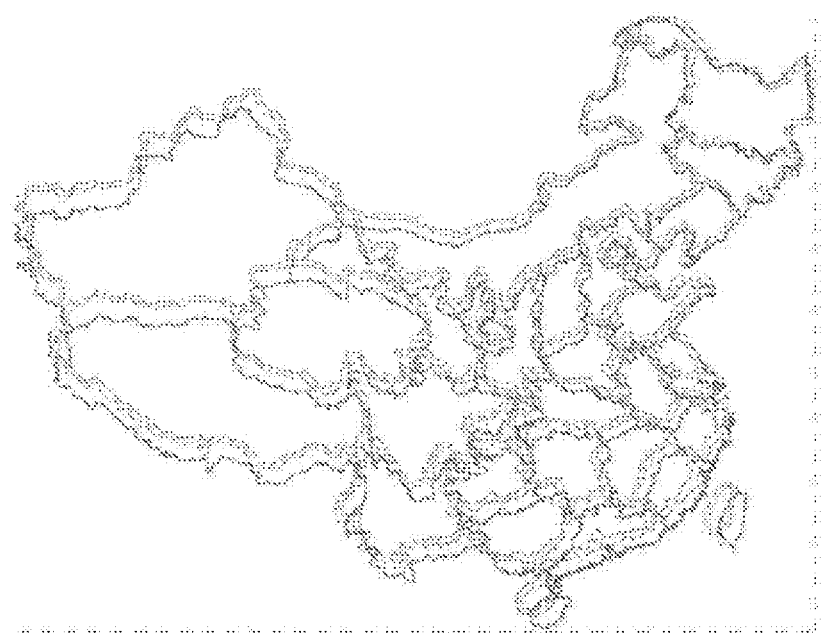
FIG. 6 is a schematic diagram of a projection map when only a difference of rotation exists.

(3) Multivariate non-linear fitting algorithm of a radial basis function (RBF) neural network. Both the two cases considered above are rarely seen. Although it is considered that only rotation transformation exists between the map and a projection map corresponding to the projection algorithm (as shown in FIG. 6), both x and y are related to m_x and m_y, that is, the f and the g are multivariate functions. In this case, a result obtained by using the multivariate non-linear fitting algorithm of the RBF neural network can reach sub-pixel-level precision, and the calculation efficiency is also rather considerable. An error usually does not exceed 1/10 pixel, and is usually between one ten-thousandth and one hundredth pixel. In this way, higher precision can be implemented, and zooming of different levels can also be performed for the acquired map without losing precision.

In addition, it may be understood that the foregoing fitting algorithms may be combined for use to obtain a more precise result.

Figure 7:
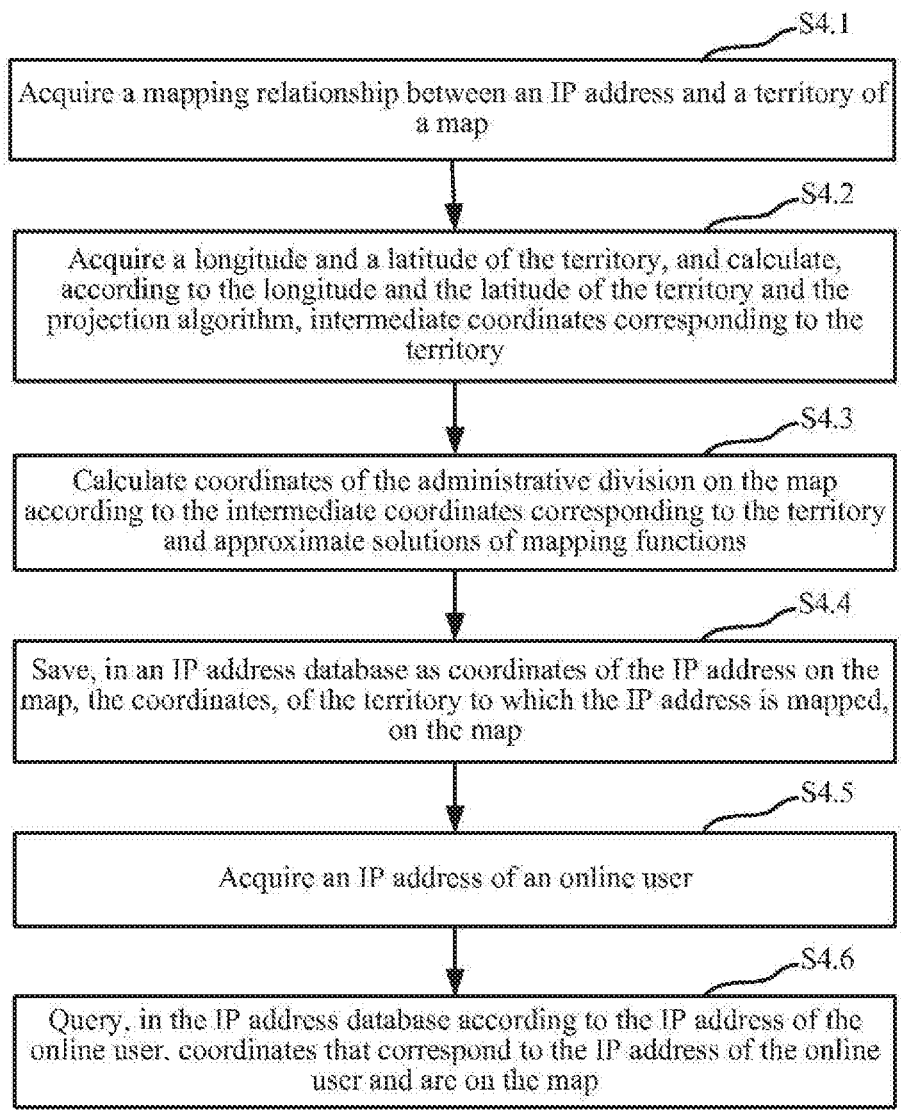
FIG. 7 is a flowchart of calculation of coordinates of an online user on a map.

Referring to FIG. 7, step S4 specifically includes steps S4.1 to S4.6 as follows:

Step S4.1: Acquire a mapping relationship between an IP address and a territory of the map.

Step S4.2: Acquire a longitude and latitude of the territory, and calculate, according to the longitude and the latitude of the territory and the projection algorithm, intermediate coordinates corresponding to the territory.

Step S4.3: Calculate coordinates of the territory on the map according to the intermediate coordinates corresponding to the territory and the approximate solutions of the mapping functions.

Step S4.4: Save, in an IP address database as coordinates of the IP address on the map, the coordinates, of the territory to which the IP address is mapped, on the map.

Step S4.5: Acquire an IP address of an online user.

Step S4.6: Query, in the IP address database according to the IP address of the online user, coordinates that correspond to the IP address of the online user and are on the map.

A description is provided below in further detail with reference to specific embodiments.

In step S4.1, multiple IP address databases may be combined to obtain the mapping relationship between an IP address and a territory more precisely and comprehensively.

The IP address database includes, but is not limited to, various IP address databases such as GeoIP (http://www.geoiptool.com/zh/) disclosed on the Internet.

Figure 8:
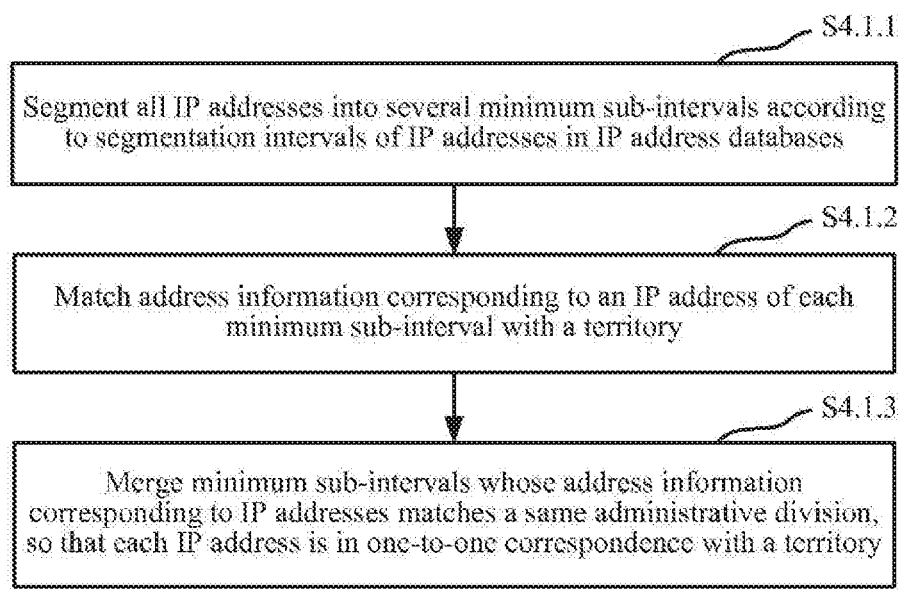
FIG. 8 is a flowchart of combination of multiple IP address databases.
Figure 9:
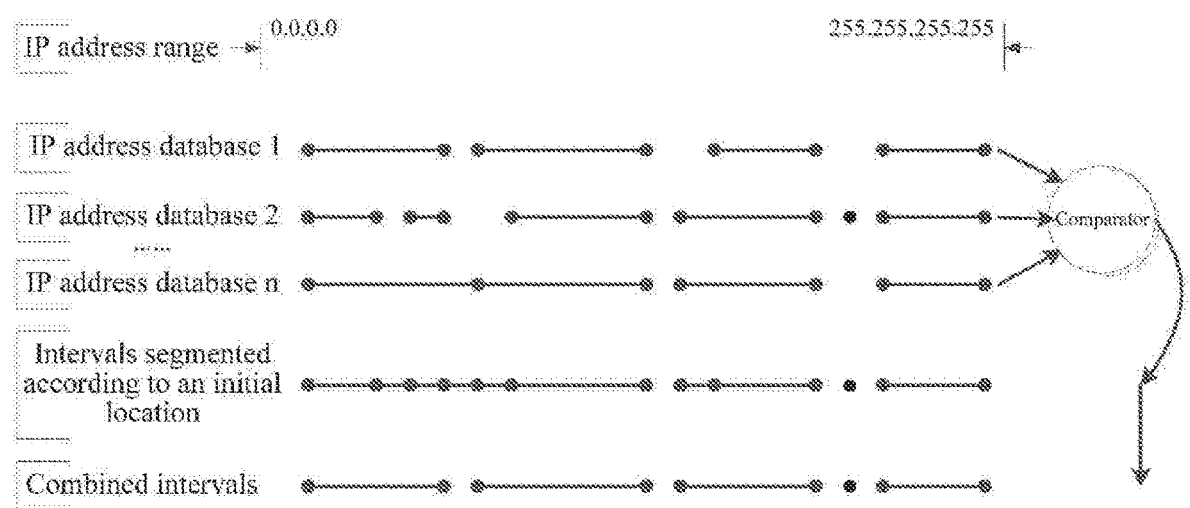
FIG. 9 is a schematic principle diagram of combination of multiple IP address databases.

Referring to FIG. 8, the combining multiple IP address databases specifically includes steps S4.1.1 to S4.1.3 as follows:

Step S4.1.1: Segment all IP addresses into several minimum sub-intervals according to segmentation intervals of IP addresses in IP address databases. As shown in FIG. 9, all the IP addresses range from 0.0.0.0 to 255.255.255.255. With reference to segmentation intervals of IP addresses of IP address database 1, IP address database 2, to IP address database n, the IP addresses within the range from 0.0.0.0 to 255.255.255.255 may be segmented into several minimum sub-intervals.

Step S4.1.2: Match address information corresponding to an IP address of each minimum sub-interval with a territory. Data formats of address information corresponding to an IP address in each IP address database are not completely the same. For example, for a same IP address segment, corresponding address information in some IP address databases is "Wuhan, China", corresponding address information in some IP address databases is "Hongshan district, Wuhan", and corresponding address information in some other IP address databases is "first dormitory of Huazhong University of Science and Technology." Therefore, address information corresponding to an IP address needs to be matched with a territory in a preset territory table, so that all IP addresses correspond to standard territories.

Figure 10:
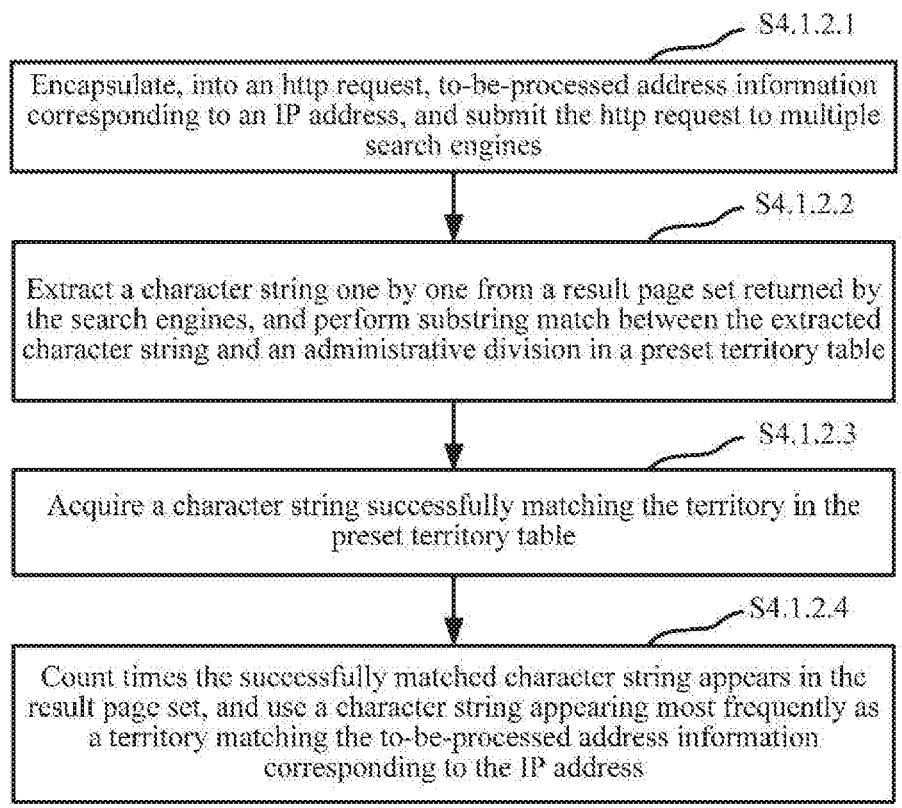
FIG. 10 is a flowchart of corresponding match between an IP address and a territory.

Referring to FIG. 10, the matching address information corresponding to an IP address of each minimum sub-interval with a territory specifically includes steps S4.1.2.1 to S4.1.2.4 as follows:

Step S4.1.2.1: Encapsulate, into an http request, to-be-processed address information such as the non-standard territory "first dormitory of Huazhong University of Science and Technology" corresponding to an IP address, and submit the http request to several well-known search engines such as Soso (http://www.soso.com/), Baidu (http://www.baidu.com/), Wikipedia (http://zh.wikipedia.org/), and Google (http://www.google.com).

Step S4.1.2.2: Extract a character string one by one from a result page set returned by the search engines, and perform substring match such as fuzzy match or prefix match between the extracted character string and a territory in a preset territory table. In this embodiment, the result page set may be pages pointed by all primary links in first pages obtained after the search engines search for the address information.

Step S4.1.2.3: Acquire a character string successfully matching the territory in the preset territory table. For example, the to-be-processed address information corresponding to the IP address is "first dormitory of Huazhong University of Science and Technology". The result page set returned by the search engines includes character strings "Wuhan, China" and "Hongshan district, Wuhan", and the preset territory table includes two territories "Wuhan, China" and "Hongshan district, Wuhan"; therefore, the character strings "Wuhan, China" and "Hongshan district, Wuhan" successfully match the territories in the preset territory table.

Figure 11:
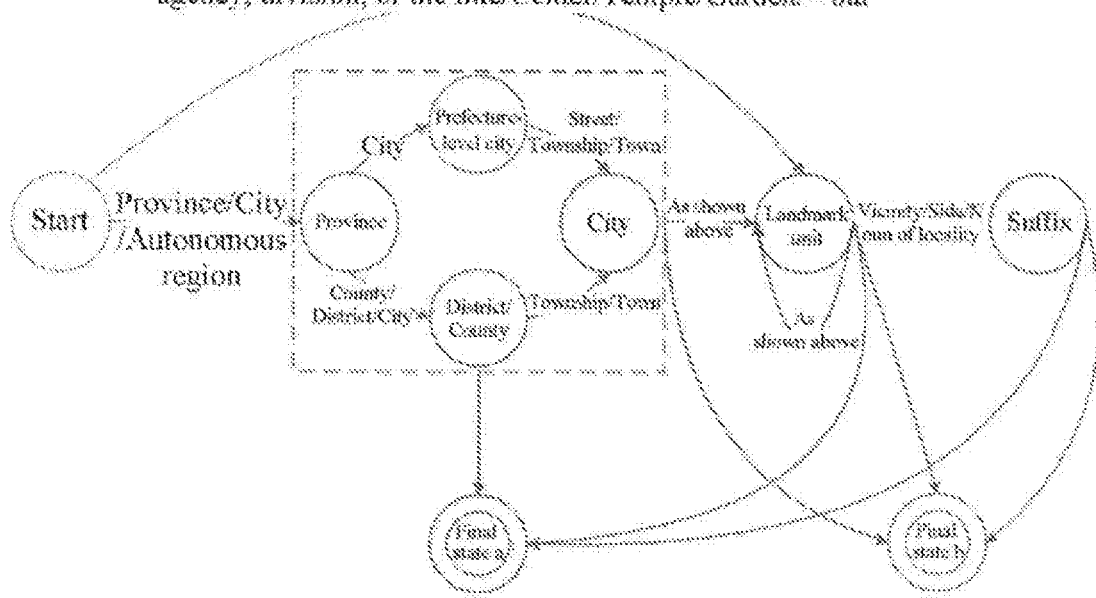
FIG. 11 is a schematic diagram of a finite state machine whose processing is precise to territories of a city level.

To better distinguish a standard territory and a non-standard territory, and improve quality of to-be-processed address information as a keyword of the search engines, a preferred embodiment of a finite state machine for processing to-be-processed address information is provided. FIG. 11 is a schematic diagram of a finite state machine whose processing is precise to territories of a city level. To-be-processed address information is first input to a dotted box in FIG. 11, and the to-be-processed address information is then identified with reference to a preset territory table. For example, the finite state machine is used to identify whether to-be-processed address information whose suffix is "city" belongs to a direct-controlled municipality, a prefecture-level city, or a county-level city.

Specifically, if it is identified that a territory corresponding to the to-be-processed address information is at a city level, final state a is entered; otherwise, final state b is entered, which may be implemented by recording a passed state path in program of the state machine, or may be implemented by adding an additional state. Some to-be-processed address information such as "school" is a collective substitute name, and may be specifically "university", "collage", "middle school", "elementary school", or the like. "x bar" may be "wine bar", "Internet bar", or the like. n in address information such as "n district" represents a number. "Noun of locality" may be "east", "south", "west", "north", "above", "below", "outside", or the like.

The to-be-processed address information is inputted to the finite state machine. If final state a is finally entered, a standard territory such as a needed territory <province>---<city/county>---<city> is identified and output. If final state b is entered, step S4.1.2.1 is entered for processing after character strings are connected according to a rule (subject to needed precision). In addition, in step S4.1.2.1, the character string in the result page set returned by the search engines may also be processed by the finite state machine. If final state a is entered after the character string is input to the finite state machine, it indicates that the character string is successfully identified as a standard territory; and if final state b is entered, it indicates that identification of the character string fails.

Figure 12:
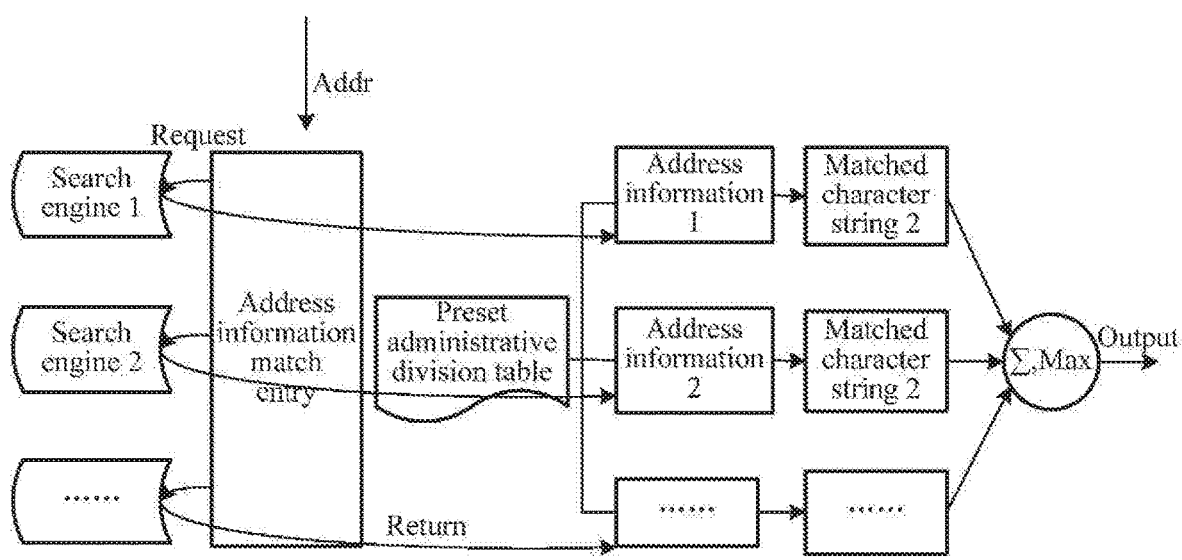
FIG. 12 is a schematic diagram showing match and standardization processing of address information of an IP address.

Step S4.1.2.4: Count times the character string successfully matching the territory in the preset territory table appears in the result page set, and use a character string appearing most frequently as a territory matching the to-be-processed address information corresponding to the IP address, as shown in FIG. 12. If the character string "Hongshan district, Wuhan" appears most frequently in the result page set, "Hongshan district, Wuhan" is used as the territory matching the to-be-processed address information corresponding to the IP address.

Step S4.1.3: Merge minimum sub-intervals whose address information corresponding to IP addresses matches a same territory, so that each IP address is in one-to-one correspondence with a territory. As shown in FIG. 9, for example, address information corresponding to IP addresses of a minimum sub-interval whose IP addresses range from [0.0.0.0] to [0.0.0.12] matches the territory "Hongshan district, Wuhan", address information corresponding to IP addresses of a minimum sub-interval whose IP addresses range from [0.0.0.13] to [0.0.0.35] also matches the territory "Hongshan district, Wuhan", and the minimum sub-interval whose IP addresses range from [0.0.0.0] to [0.0.0.12] and the minimum sub-interval whose IP addresses range from [0.0.0.13] to [0.0.0.35] may be merged. That is, a territory corresponding to an IP address segment [0.0.0.0] to [0.0.0.35] is "Hongshan district, Wuhan". It may be understood that the match between an IP address and a territory is merely for the purpose of exemplary description, and does not represent an actual case.

The merging minimum sub-intervals whose address information corresponding to IP addresses matches a same territory may be implemented by using a vote comparator. Each minimum sub-interval and a matched territory are sent to the vote comparator, and are compared with a minimum sub-interval and a matched territory that are previously voted; and if the territories are the same, the corresponding minimum sub-intervals are merged. The vote comparator may be designed by using a method of being greater than n/2 and/or by using a method of referring to an IP address database.

In step S4.5, a behavior log file of the online user is processed by using an adaptive multithreaded processing model, and the behavior log file is analyzed, to obtain the IP address and a behavior state of the online user. The behavior log file records the IP address and the behavior state of the online user, and the behavior state includes, for example, login, picture uploading or downloading, video chat, and the like.

The IP address database in step S4.6 saves coordinates of an IP address on the map, and corresponding coordinates of the online user on the map can be found from the IP address database according to the IP address of the online user.

To make query for the coordinates that correspond to the IP address of the online user and are on the map more efficient, that is, provide better real-time quality, the IP address database stores coordinates of an IP address on the map by using a two-level data structure in memory. A first level is an index array of 0 to 65535 that correspond to little-endian IP addresses and are represented by two high bytes, and a second level is a first order kd tree in which two low bytes are divided according to a median. This storage structure is used for a few reasons. 1. There are few enterprises that have a trans-category B address segment, which means, to be more precise, that two high bytes of all IP addresses in the segment are the same, or even have a complete category A address segment; and 2. Many IP address segments of a same region are a complete category B or category C address (to be more precise, two high bytes or three high bytes of all IP addresses in a segment are the same). By using this data storage structure, average memory access times for query of each IP address can be reduced to a unit's digit, and time consumption can be reduced from around one microsecond of complete dichotomy search to tens to hundreds of nanoseconds.

Step S4.6 further includes storing the IP address and the behavior state of the online user and the coordinates on the map into a database on a server, so that when online user distribution at any previous time is queried, an IP address and a behavior state of an online user at the time and coordinates that correspond to the online user and are on the map can be read from the database of the server.

In a preferred embodiment, the database is divided into two levels. One level is a memory database for real-time display, and the memory database only stores a quantity of online users that are obtained by counting and precise to specific territory levels, coordinates on the map, and behavior state types. The other level is a disk database for playing back online user distribution and collating data when the IP address database changes. The disk database not only is used to store the quantity of online users that are obtained by counting and precise to specific territory levels, the coordinates on the map, and the behavior state types, but also is used to store data such as an IP address and a behavior state of each user.

Figure 13:
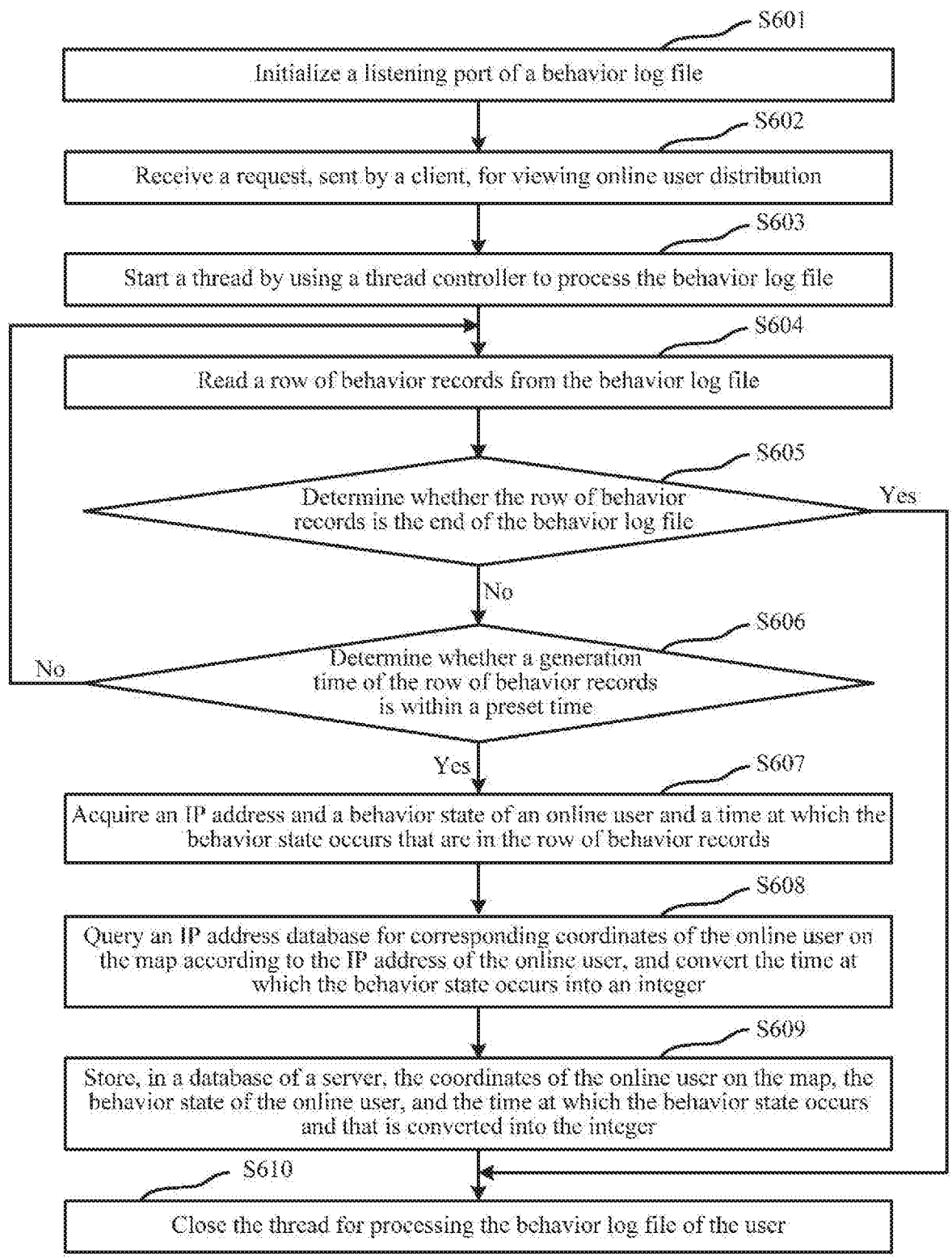
FIG. 13 is a flowchart showing processing of a behavior log file of a user.

Specifically, refer to FIG. 13, which shows an example for processing a behavior log file of an online user, and acquiring coordinates that correspond to the online user and are on the map, and includes steps S601 to S610.

Step S601: Initialize a listening port of a behavior log file.

Step S602: Receive a request, sent by a client, for viewing online user distribution.

Step S603: Start a thread by using a thread controller to process the behavior log file.

Step S604: Read a row of behavior records from the behavior log file.

Step S605: Determine whether the row of behavior records is the end of the behavior log file; and if the row of behavior records is not the end of the behavior log file, perform step S606; and if the row of behavior records is the end of the behavior log file, perform step S610.

Step S606: Determine whether a generation time of the row of behavior records is within a preset time such as a second before a current time. If the generation time of the row of behavior records is within the preset time, perform step S607. If the generation time of the row of behavior records is not within the preset time, return to step S604.

Step S607: Acquire an IP address and a behavior state of an online user and a time at which the behavior state occurs that are in the row of behavior records. The time at which the behavior state occurs is represented by a distance from a reference time such as seconds before Jan. 1, 1970.

Step S608: Query an IP address database for corresponding coordinates of the online user on the map according to the IP address of the online user, and convert the time at which the behavior state occurs into an integer.

Step S609: Store, in a database of a server, the coordinates of the online user on the map, the behavior state of the online user, and the time at which the behavior state occurs and that is converted into the integer.

Step S610: Close the thread for processing the behavior log file of the user.

Figure 14:
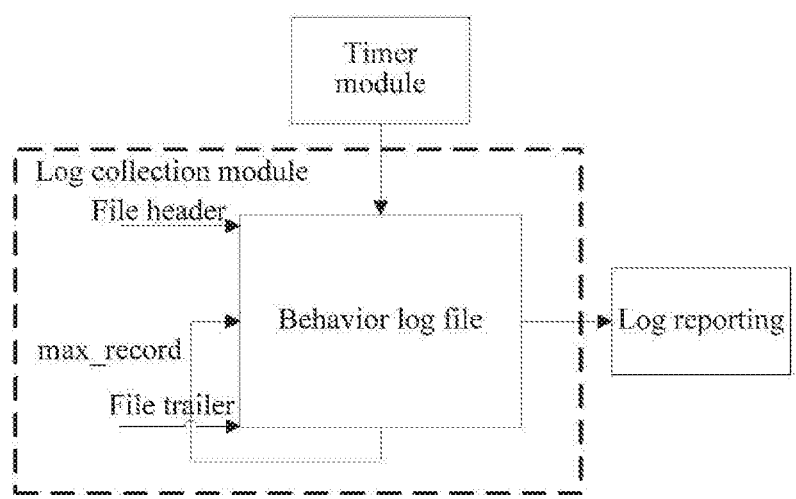
FIG. 14 is a schematic diagram showing collection of a log record from a behavior log file of a user.

To process constantly generated behavior log files in real time, a log collection module may be deployed in the server, and is configured to collect behavior records that are in the behavior log files and generated within preset times, and then process only the collected behavior records. In consideration of data amounts and real-time requirements in different cases, referring to FIG. 14, a Linux operating system is used as an example in this embodiment, and the behavior records may be collected from the behavior log files by using two methods.

(1) A behavior record newly generated in a behavior log file is listened for by using a watch command and a tail command of Linux, and a behavior record generated within a recent preset time such as a second before a current time is collected.

Specifically, a -n parameter of the tail command is used to take out n rows of behavior records recently generated in the behavior log file. The watch command is used to periodically execute a command line. First, max_record rows of behavior records newly generated in the behavior log file can be taken out each second by using a command line of watch -n 1 tail -n max_record. A value of the max_record is acquired by using a method of counting, for a long time, quantities of rows of behavior records generated each second, calculating a maximum value of the quantities of rows of behavior records generated each second, and then multiplying the maximum value by a coefficient greater than 1. In this way, the value of the max_record can be obtained. Then, behavior records that are among the acquired max_record rows of behavior records and are not generated within the preset time are excluded, and remaining behavior records are behavior records generated within the preset time.

(2) A location of max_record before a file trailer is recorded in real time in a behavior log file by using an fp pointer, and max_record rows of behavior records are then taken out. Finally, behavior records that are among the acquired max_record rows of behavior records and are not generated within a preset time are excluded, and remaining behavior records are behavior records generated within the preset time. It is noteworthy that if a first behavior log file being currently processed is switched to a second behavior log file newly generated, the first behavior log file switched needs to be traced back to continue collecting a behavior record generated within the preset time.

Figure 15:
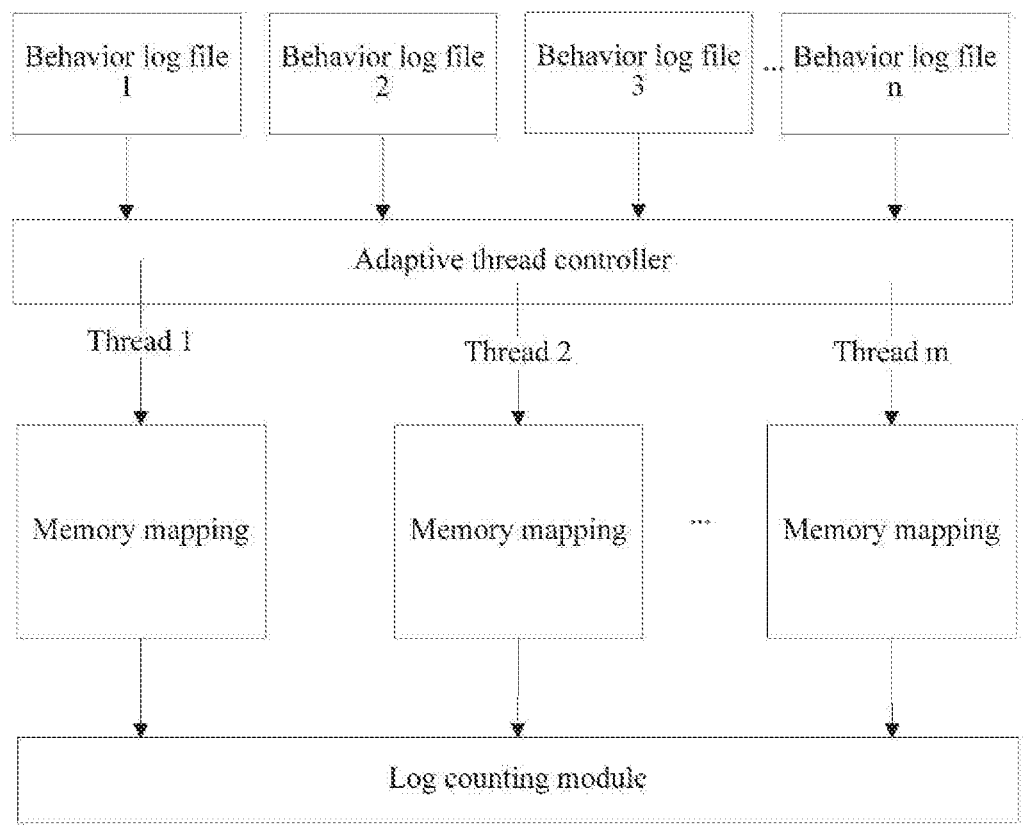
FIG. 15 is a schematic diagram of an adaptive multi-threaded processing model.

In addition, in this embodiment, in view of that behavior log files are characterized by a time sequence, different behavior log files are processed by using multiple threads. However, an increase of thread quantity intensifies resource competition, which instead reduces efficiency of processing behavior log files. To efficiently process behavior log files, this embodiment uses an adaptive multithreaded processing model (as shown in FIG. 15), and a thread quantity is controlled by using a threshold mechanism.

Figure 16:
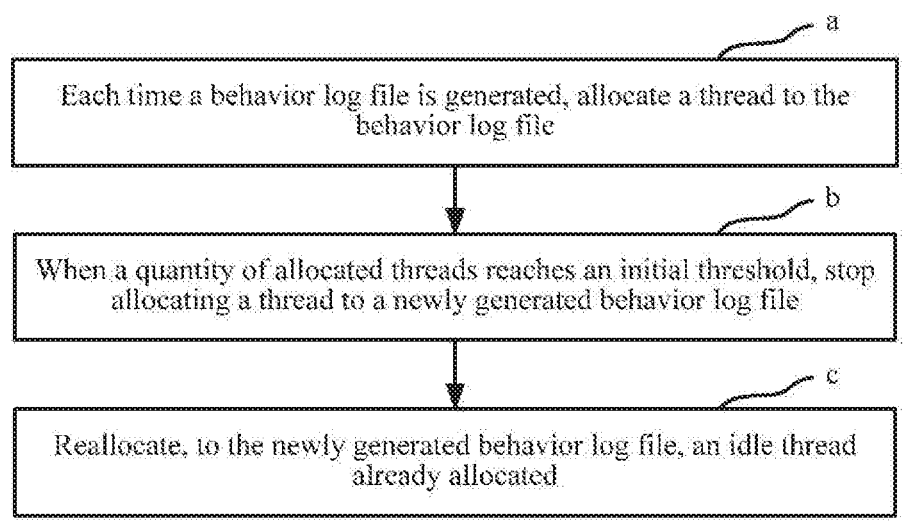
FIG. 16 is a flowchart showing processing of a behavior log file of a user by using an adaptive multithreaded processing model.

Specifically, refer to FIG. 16, which is a flowchart of processing behavior log files by using the adaptive multithreaded processing model. Before step a is entered, an initial threshold is first preset, for example, the initial threshold is 8.

Step a: Each time a behavior log file is generated, allocate a thread to the behavior log file to process the behavior log file.

Step b: When a quantity of allocated threads reaches the initial threshold, stop allocating a thread to a newly generated behavior log file.

Step c: Reallocate, to the newly generated behavior log file, an idle thread already allocated to process the newly generated behavior log file, so as to limit a thread quantity and alleviate resource competition.

In massive Internet service systems, multiple servers may be distributed in different regions, each server generates a behavior log file of a user in real time; therefore, behavior log files generated in real time need to be processed on the multiple servers distributed in the different regions, and combination or merging processing is then performed on processing results.

In a process of processing a behavior log file, in this embodiment, the behavior log file is accessed by using a memory mapping technology, and all or a part of the behavior log file is associated with a region of virtual address space of a thread. In this way, the associated behavior log file can be directly accessed without performing an I/O operation on the behavior log file, thereby improving the file access efficiency. It is known from an experiment that a behavior log file of 5 G can be processed within 40 seconds by using the memory mapping technology in a single physical server or a single ordinary SATA disk.

In another embodiment, if a client used by an online user such as a mobile phone or a tablet computer has a global positioning system (GPS) function, location information of the online user can be directly acquired from the client. Intermediate coordinates of a location in which the online user is located are then calculated according to the location information and the projection algorithm, and coordinates of the online user on the map are then calculated according to the intermediate coordinates of the location in which the online user is located and the approximate solutions of the mapping functions. The coordinates of the online user on the map do not need to be indirectly calculated according to an IP address of the online user.

The distribution data of the online users on the map in step S5 include, for example, a total quantity of online users, a quantity and behavior states of online users within each territory, a proportion of the quantity of online users within each territory to the total quantity of online users, and the like. Step S5 further includes returning the distribution data of the online users on the map to a client, so that the client displays online user distribution on the map in a visible manner.

After the client receives the distribution data of the online users on the map, the client draws a graph of the online user distribution on the map according to the distribution data. Specifically, the client may first draw a preset number of points on the map, and allocate the preset number of points to each territory. The client may represent the quantity and distribution of online users within each territory by setting visibility of points within each territory. The client may set a number of points within each territory to be visible according to the proportion of the quantity of online users within the territory to the total quantity of online users. The visible points represent online users.

Besides, a quantity of online users may also be represented by setting a size of a point. The more a quantity is, the bigger a point is; and the larger a quantity is, the smaller a point is. Different behavior states of online users may also be represented by setting colors of points. For example, a red point represents that a corresponding quantity of online users are uploading pictures, and a green point represents that a corresponding quantity of online users are performing video chat. In this way, different behavior states may be displayed on different maps, or may be alternately displayed on a same map at different times.

Figure 17:
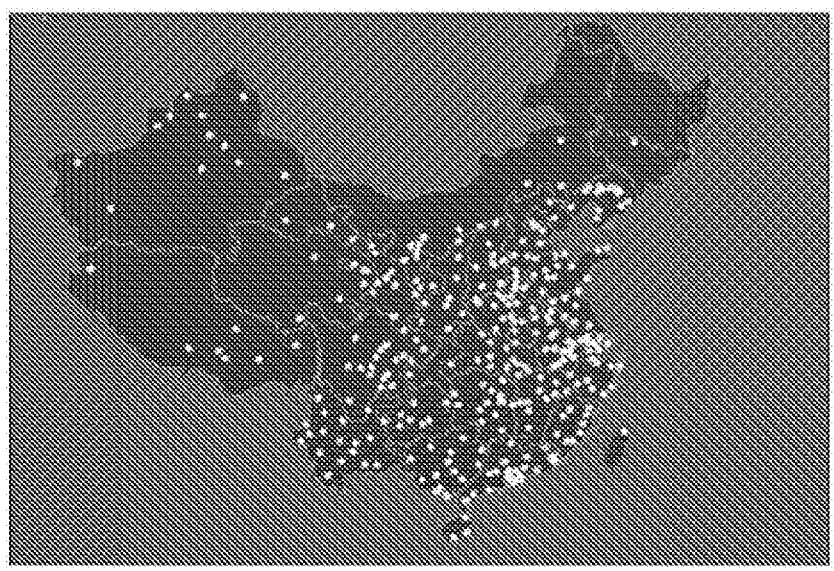
FIG. 17 is a schematic diagram of points, on which skewed distribution processing is not performed, corresponding to online users, and on a map.
Figure 18:
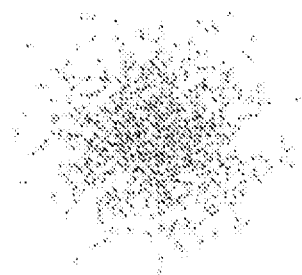
FIG. 18 is a schematic diagram of a point cloud effect.

Residents within a territory is usually characterized by skewed distribution, that is, residents concentrate in the center and disperse on the edge; and there are many residents in the center of the territory, but there are few residents in a suburb. The coordinates of the online user on the map usually refer to coordinates, of a central location of a territory to which the online user belongs, on the map. If distribution of the online user is displayed on the map completely according to the coordinates of the online user on the map, all online users within a same territory to which the online users belong are displayed in a central location of the territory, as shown in FIG. 17. This display method cannot reflect the characteristic of skewed distribution of residents within a territory; therefore, skewed distribution processing needs to be performed on a point belonging to each territory, and distribution of online users within each territory is displayed by using a point cloud effect of skewed distribution, as shown in FIG. 18.

Figure 19:
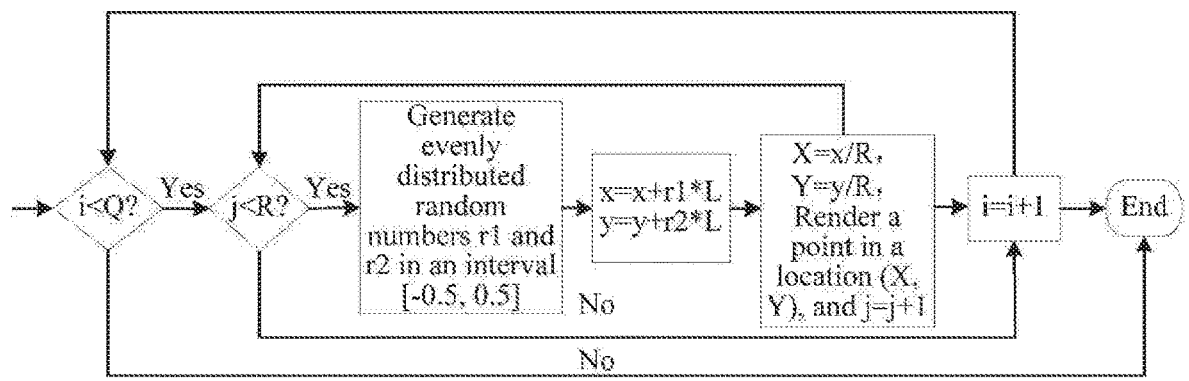
FIG. 19 is a principle diagram of skewed distribution processing.

In this embodiment, skewed distribution processing may be performed, by using the principle diagram shown in FIG. 19, on a point belonging to each territory. Q and R are preset maximum circulating times, L is a preset variable, (x, y) is corresponding coordinates of an online user on the map, and (X, Y) is coordinates of a point on the map after skewed distribution processing. The graph of the online user distribution may be obtained according to the coordinates of a point on the map after skewed distribution processing.

Figure 20:
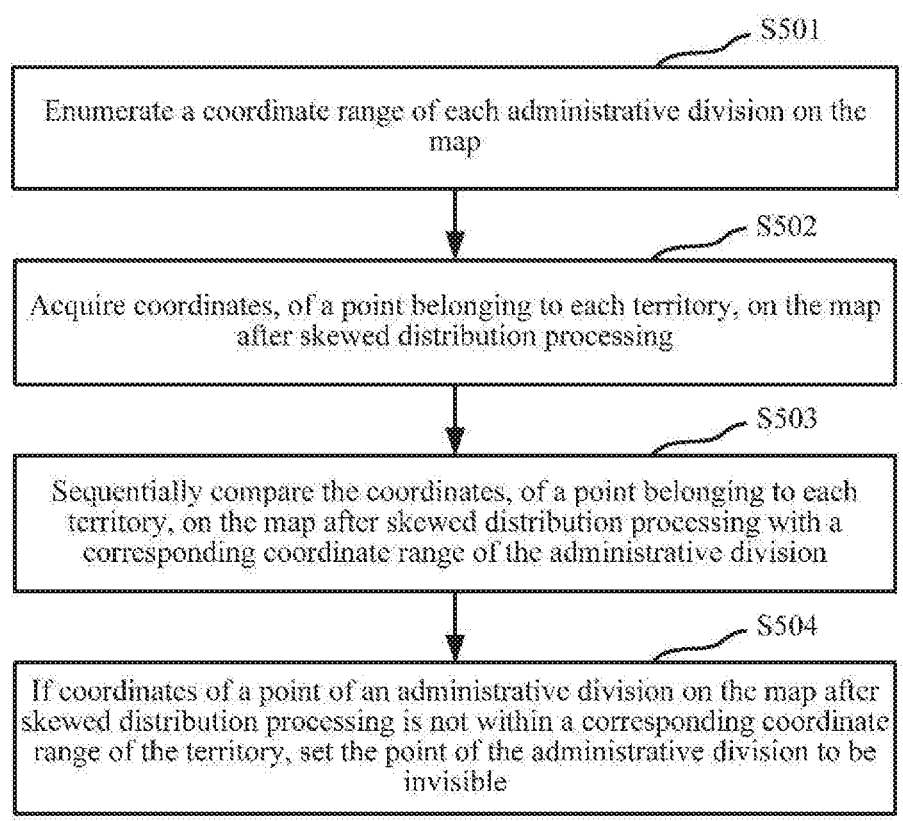
FIG. 20 is a flowchart showing that it is avoided that a point is displayed outside the border of a territory.

Because a quantity of visible points within each territory may dramatically increase, to facilitate management, all points within a same territory may be encapsulated into a point object group to perform skewed distribution processing. After skewed distribution processing is performed on the points, some visible points may be located outside the border of the territory. To solve this problem, referring to FIG. 20, steps S501 to S504 may be used as follows:

Step S501: Enumerate a coordinate range of each territory on the map.

Step S502: Acquire coordinates, of a point belonging to each territory, on the map after skewed distribution processing.

Step S503: Sequentially compare the coordinates, of a point belonging to each territory, on the map after skewed distribution processing with a corresponding coordinate range of the territory.

Step S504: If coordinates of a point of a territory on the map after skewed distribution processing is not within a corresponding coordinate range of the territory, set the point of the territory to be invisible.

To facilitate management, all coordinates within the coordinate range may also be first rounded off, coordinates of a point on the map after skewed distribution processing are rounded off, and the rounded coordinates of a point on the map after skewed distribution processing are compared with the rounded coordinate range.

In this embodiment, the client periodically requests latest distribution data of online users from the server, and updates the graph of the online user distribution according to the latest distribution data of online users. After the client receives the distribution data of online users on the map, the client first draws a preset quantity of points. Each time latest distribution data of online users is received afterwards, only visibility, colors, and the like of the preset quantity of points are changed without updating a display page each time to represent changes of behavior states of the online users.

Figure 21:
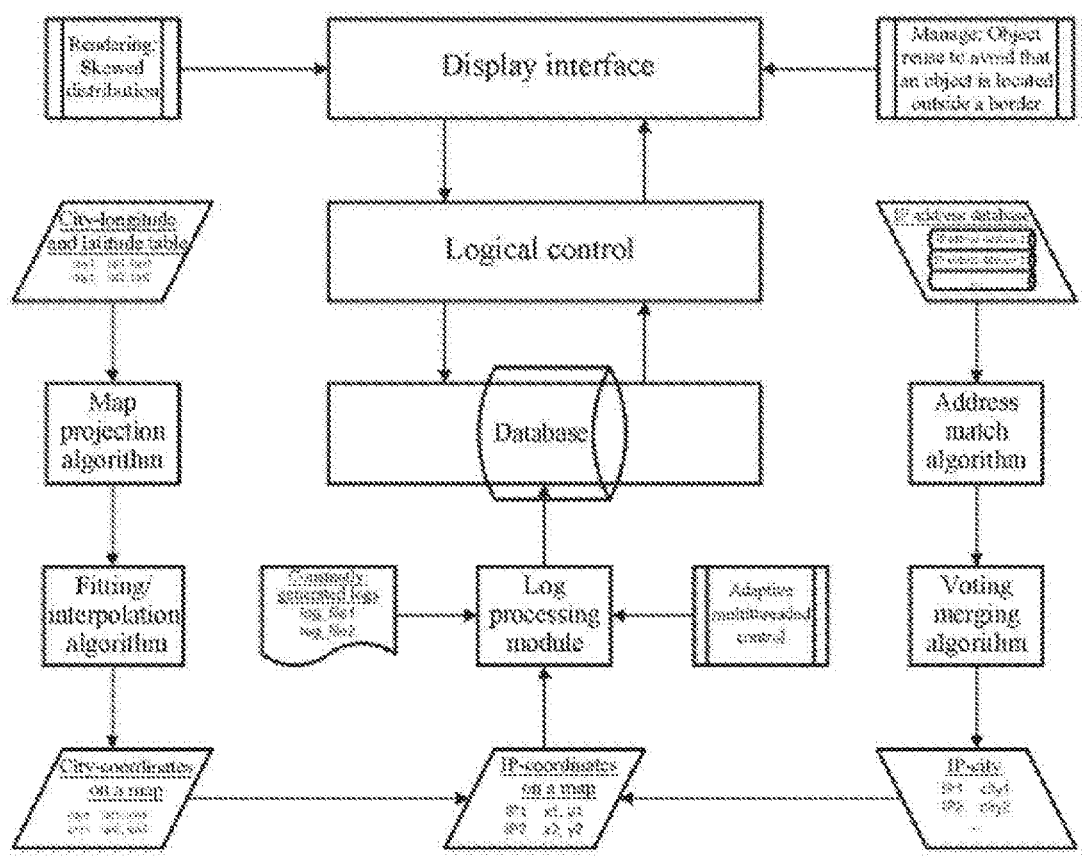
FIG. 21 is an entire architectural diagram of a method for processing online user distribution according to an embodiment of the present invention.

For a process from step 51 to step S5, reference may be made to FIG. 21. Step 51 to step S3 may be performed offline, and step S4 and step S5 need to be performed online. An entire system shown in FIG. 21 is formed by five parts of an IP address-map coordinate database generation module, a log processing module, a database layer, a logical control layer, and a display interface. The IP address-map coordinate database generation module performs offline calculation, other modules run in a manner of online processing, and the database layer further provides a function of playing back historical data. The logical control layer is used to periodically acquire, from a server, distribution data of online users on a map, and returns the distribution data of the online users on the map to a client, so that the client displays online user distribution on the map in a visible manner.

In addition, an embodiment of the present invention further provides a function of further querying a quantity and behavior states of online users within a territory. When a request, sent by the client, for viewing a territory is received, a quantity and behavior states of online users within the territory are counted according to IP addresses and behavior states of online users and corresponding coordinates on the map that are stored in a database of the server. For example, a quantity of online users is 2 hundred thousand, 20 thousand people are uploading pictures, and 10 thousand people are performing video chat. Then, the counted quantity and behavior states of the online users within the territory are sent to the client, and the client displays the quantity and the behavior states of the online users within the territory on the map in a visible manner.

Figure 22:
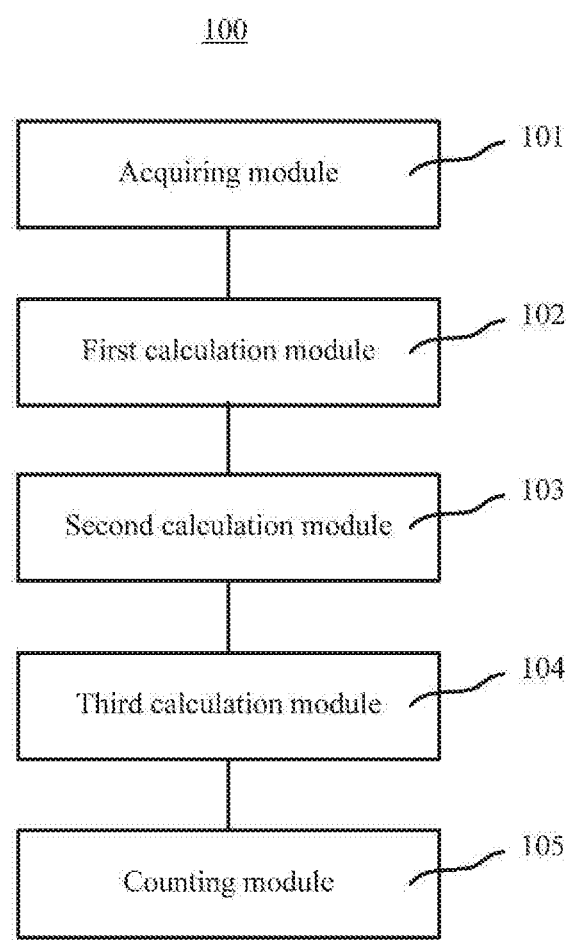
FIG. 22 is a block diagram of an apparatus for processing online user distribution according to an embodiment of the present invention.

Referring to FIG. 22, an embodiment of the present invention further provides an apparatus for processing online user distribution 100. The apparatus includes an acquiring module 101, a first calculation module 102, a second calculation module 103, a third calculation module 104, and a counting module 105. It may be understood that the foregoing modules refer to computer programs or program segments for performing one or multiple specific functions. In addition, differentiation of the foregoing modules does not represent that actual program code must also be separated.

The acquiring module 101 is configured to acquire a map for displaying online user distribution, a projection algorithm of the map being unknown, the map including multiple points with known coordinates and longitudes and latitudes.

The first calculation module 102 is configured to calculate the projection algorithm of the map.

The second calculation module 103 is configured to perform calculation to obtain intermediate coordinates of at least one of the points according to a longitude and latitude and the projection algorithm, and acquire, by using a fitting algorithm, approximate solutions of functions of mapping the intermediate coordinates to the coordinates on the map. The points with known coordinates and longitudes and latitudes on the map are used for fitting calculation and precision checking in the fitting algorithm.

The third calculation module 104 is configured to calculate coordinates of each online user on the map according to the projection algorithm and the approximate solutions of the mapping functions.

The counting module 105 is configured to count distribution data of online users on the map according to coordinates of all the online users on the map.

For specific working processes of the foregoing modules, reference may be further made to the method for processing online user distribution provided in the embodiments of the present invention, and a description is not provided herein again.

In addition, an embodiment of the present invention further provides a computer readable storage medium. The computer readable storage medium stores a computer executable instruction, and the computer readable storage medium is, for example, a non-volatile memory such as an optical disc, a hard disk, or a flash memory. The computer executable instruction is used to enable a computer or a similar operation apparatus to perform various operations in the method for processing online user distribution.

The above descriptions are merely preferred embodiments of the present invention, and are not intended to limit the present disclosure in any form. Although the present disclosure has been disclosed above through the preferred embodiments, the embodiments are not intended to limit the present disclosure. Any person skilled in the art can make some replacements or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method, comprising,
  acquiring a map that includes a plurality of points with known map coordinates and known latitudes and longitudes, the map having been produced by an unknown projection algorithm;
  using the plurality of points with known map coordinates and known latitudes and longitudes, determining, from a plurality of known projection algorithms, a projection algorithm producing a closest fit to the acquired map;

calculating, using the determined projection algorithm, intermediate coordinates of the plurality of points with known map coordinates and known latitudes and longitudes;

using the intermediate coordinates for the plurality of points and the known map coordinates for the plurality of points, acquiring an approximate solution for a function for mapping intermediate coordinates to coordinates on the map;

determining, for a plurality of online users, coordinates on the map according to the determined projection algorithm and the approximate solution for the function for mapping intermediate coordinates to coordinates on the map, including:

acquiring a database mapping IP addresses to geographical territories;

for each geographical territory in the database:

acquiring a latitude and longitude of the geographical territory;

calculating, according to the latitude and longitude of the geographical territory, intermediate coordinates for the geographical territory;

determining, for the geographical territory, coordinates on the map according to the determined projection algorithm and the approximate solution for the function for mapping intermediate coordinates to coordinates on the map;

storing, in an IP address database, the coordinates of the geographical territory and the corresponding IP address from the database mapping IP addresses to geographical territories;

acquiring an IP address of a respective user of the plurality of online users by processing a behavior log file of the respective user using an adaptive multi-threaded processing model and analyzing the behavior log file to obtain the IP address of the respective user; and querying, in the IP address database, coordinates that correspond to the IP address of the respective user; and tallying a geographical distribution of online users on the map according to the determined coordinates of the plurality of online users;

wherein processing a behavior log file of the respective user using an adaptive multithreaded processing model comprises:

allocating a thread to a behavior log file each time the behavior log file is generated;

stopping allocating a thread to a newly-generated behavior log file when a quantity of allocated threads reaches a present initial threshold; and reallocating, to the newly-generated behavior log file, an idle thread already allocated.

2. The method of claim 1, wherein acquiring a database mapping IP addresses to geographical territories includes:

merging multiple databases into a single database mapping IP addresses to geographical territories.

3. The method of claim 2, wherein merging multiple databases into a single database mapping IP addresses to geographical territories includes:

segmenting all IP addresses into a plurality of intervals;

for an IP address in each interval of the plurality of intervals, matching a physical location of the IP address to a geographical territory; and merging intervals having IP addresses corresponding to a same geographical territory, so that each IP address in the single database corresponds to a territory.

4. The method of claim 3, wherein matching the physical location of an IP address to a geographical territory comprises:

obtaining location information from the database mapping IP addresses to geographical territories;

submitting, to a plurality of search engines, the location information from the database mapping IP addresses to geographical territories;

from each of the plurality of search engines:

extracting a first character string from a result returned by the search engine;

performing a substring match between the first character string and a geographical territory in a preset territory table;

from the substring match, acquiring a second character string matching the geographical territory in the present territory table;

counting a number of times that the second character string appears in a results page set; and when the second character string appears most frequently in the results page set, using the second character string for IP addresses within that geographical territory.

5. The method of claim 1, wherein determining, for the plurality of online users, coordinates on the map includes, for a respective user:

receiving location information sent by a client used by the respective user, wherein the location information comprises a location at which the respective user is located;

calculating intermediate coordinates of the location at which the respective user is located according to the location information and the projection algorithm; and calculating coordinates of the respective user on the map according to the intermediate coordinates of the location at which the respective user is located and the approximate solution of the function for mapping intermediate coordinates.

6. The method of claim 1, wherein determining, from a plurality of known projection algorithms, a projection algorithm producing a closest fit to the acquired map comprises:

acquiring the plurality of known projection algorithms;

extracting coordinates of a plurality of corners from the map;

separately extracting coordinates of the plurality of corners from a projection map corresponding to each projection algorithm among the plurality of projection algorithms;

separately selecting, from plurality of corners of each projection map, a corner subset coordinates corresponding to the plurality of corners; and selecting, as the projection algorithm producing the closest fit to the acquired map, the projection algorithm with a smallest distance between the plurality of corners of each projection map and the plurality of corners extracted from the map.

7. The method of claim 1, further comprising returning the geographical distribution of online users on the map to a client for visible display at the client.

8. The method of claim 7, further comprising:

periodically requesting, by the client, a latest geographical distribution of online users on the map from a server; and updating the visible display according to the latest geographical distribution.

9. A non-transitory computer-readable storage medium storing executable instructions which, when executed by a computer, cause the computer to perform operations including:

acquiring a map that includes a plurality of points with known map coordinates and known latitudes and longitudes, the map having been produced by an unknown projection algorithm;

using the plurality of points with known map coordinates and known latitudes and longitudes, determining, from a plurality of known projection algorithms, a projection algorithm producing a closest fit to the acquired map;

calculating, using the determined projection algorithm, intermediate coordinates of the plurality of points with known map coordinates and known latitudes and longitudes;

using the intermediate coordinates for the plurality of points and the known map coordinates for the plurality of points, acquiring an approximate solution for a function for mapping intermediate coordinates to coordinates on the map;

determining, for a plurality of online users, coordinates on the map according to the determined projection algorithm and the approximate solution for the function for mapping intermediate coordinates to coordinates on the map, including:

acquiring a database mapping IP addresses to geographical territories;

for each geographical territory in the database:
  acquiring a latitude and longitude of the geographical territory;
  calculating, according to the latitude and longitude of the geographical territory, intermediate coordinates for the geographical territory;
  determining, for the geographical territory, coordinates on the map according to the determined projection algorithm and the approximate solution for the function for mapping intermediate coordinates to coordinates on the map;
  storing, in an IP address database, the coordinates of the geographical territory and the corresponding IP address from the database mapping IP addresses to geographical territories;

acquiring an IP address of a respective user of the plurality of online users by processing a behavior log file of the respective user using an adaptive multithreaded processing model and analyzing the behavior log file to obtain the IP address of the respective user; and querying, in the IP address database, coordinates that correspond to the IP address of the respective user; and tallying a geographical distribution of online users on the map according to the determined coordinates of the plurality of online users;

wherein processing a behavior log file of the respective user using an adaptive multithreaded processing model comprises:
  allocating a thread to a behavior log file each time the behavior log file is generated;
  stopping allocating a thread to a newly-generated behavior log file when a quantity of allocated threads reaches a present initial threshold; and
  reallocating, to the newly-generated behavior log file, an idle thread already allocated.

10. The non-transitory computer-readable storage medium of claim 9, wherein acquiring a database mapping IP addresses to geographical territories includes:
merging multiple databases into a single database mapping IP addresses to geographical territories.

11. The non-transitory computer-readable storage medium of claim 10, wherein merging multiple databases into a single database mapping IP addresses to geographical territories includes:
  segmenting all IP addresses into a plurality of intervals;
  for an IP address in each interval of the plurality of intervals, matching a physical location of the IP address to a geographical territory; and
  merging intervals having IP addresses corresponding to a same geographical territory, so that each IP address in the single database corresponds to a territory.

12. The non-transitory computer-readable storage medium of claim 11, wherein matching the physical location of an IP address to a geographical territory comprises:
  obtaining location information from the database mapping IP addresses to geographical territories;
  submitting, to a plurality of search engines, the location information from the database mapping IP addresses to geographical territories;
  from each of the plurality of search engines:
    extracting a first character string from a result returned by the search engine;
    performing a substring match between the first character string and a geographical territory in a preset territory table;
    from the substring match, acquiring a second character string matching the geographical territory in the present territory table;
  counting a number of times that the second character string appears in a results page set; and
  when the second character string appears most frequently in the results page set, using the second character string for IP addresses within that geographical territory.

13. The non-transitory computer-readable storage medium of claim 10, wherein determining, for the plurality of online users, coordinates on the map includes, for a respective user:
  receiving location information sent by a client used by the respective user, wherein the location information comprises a location at which the respective user is located;
  calculating intermediate coordinates of the location at which the respective user is located according to the location information and the projection algorithm; and
  calculating coordinates of the respective user on the map according to the intermediate coordinates of the location at which the respective user is located and the approximate solution of the function for mapping intermediate coordinates.

14. The non-transitory computer-readable storage medium of claim 10, wherein determining, from a plurality of known projection algorithms, a projection algorithm producing a closest fit to the acquired map comprises:
  acquiring the plurality of known projection algorithms;
  extracting coordinates of a plurality of corners from the map;
  separately extracting coordinates of the plurality of corners from a projection map corresponding to each projection algorithm among the plurality of projection algorithms;
  separately selecting, from plurality of corners of each projection map, a corner subset coordinates corresponding to the plurality of corners; and
  selecting, as the projection algorithm producing the closest fit to the acquired map, the projection algorithm with a smallest distance between the plurality of corners of each projection map and the plurality of corners extracted from the map.

15. The non-transitory computer-readable storage medium of claim 10, wherein the operations further comprise returning the geographical distribution of online users on the map to a client for visible display at the client.

16. The non-transitory computer-readable storage medium of claim 15, wherein the operations further comprise:
- periodically requesting, by the client, a latest geographical distribution of online users on the map from a server; and
- updating the visible display according to the latest geographical distribution.

\* \* \* \* \*